(No Model.)
W. H. MIDGLEY.
LAUNDRY STARCH.
No. 319,598. Patented June 9, 1885.
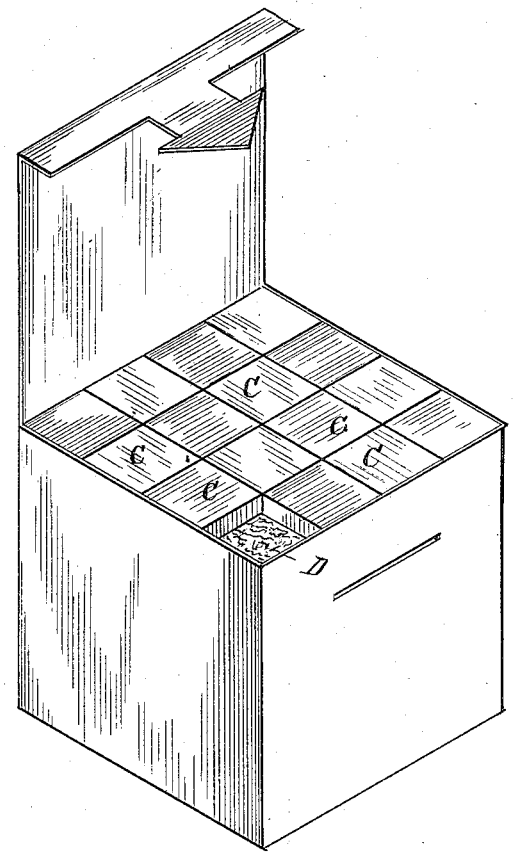
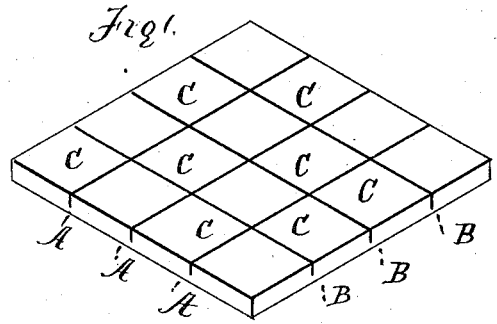
Witnesses:
C. S. Johnston
J. J. Arnold
Inventor:
William H. Midgley
By A. C. Johnston
Atty

UNITED STATES PATENT OFFICE.

WILLIAM H. MIDGLEY, OF PITTSBURG, PENNSYLVANIA.

LAUNDRY-STARCH.

SPECIFICATION forming part of Letters Patent No. 319,598, dated June 9, 1885.

Application filed September 29, 1884. Renewed May 15, 1885. (No specimens.)

*To all whom it may concern:*

Be it known that I, WILLIAM H. MIDGLEY, of Pittsburg, in the county of Allegheny and State of Pennsylvania, have invented a new and useful Improvement in Laundry-Starch; and I do hereby declare the following to be a full, clear, and exact description thereof.

In the operation of ironing clothes after washing and starching them the great desire of the launderer or laundress is to give the clothes a newness of appearance and a smooth and glossy finish.

My invention has for its object the providing of a means whereby the launderer or laundress may with facility prepare the starch for the purpose of starching the clothes, so that not only will newness of appearance and a smooth and glossy finish be given to them after the operation of ironing, but also a surface to which dust and smutty matter will not readily adhere nor penetrate, and which will, when soiled, be easily cleaned by the washing process.

My invention consists of a composition of matter consisting of spermaceti, rice-flour, gum-arabic, paraffine, stearine, and extract of slippery elm, formed into a homogeneous plastic mass, which is molded into the desired form for mixing with the starch for the starching of clothes, as will hereinafter more fully and at large appear.

To enable others skilled in the art with which my invention is most nearly connected to make and use my invention, I will proceed to describe the manner of making and using it.

In the accompanying drawings, Figure 1 is a perspective view of a cake formed of my improved compound for mixing with starch. Fig. 2 represents a perspective view of a package containing starch and a cake of my improved compound for mixing with the starch.

In making my compound I use spermaceti, paraffine, rice-flour, stearine, gum-arabic, and extract of slippery elm, and thoroughly mix them together, which is then molded into cakes of the form indicated in Fig. 1, with indentations, (shown at A B,) thereby forming sections C, which may be broken off, as indicated at D in Fig. 2, for mixing into and through the starch while preparing it for the starching of the clothes, which preparation of the starch is well understood by the launderer and laundress, and therefore need not be herein described. By dissolving one of the sections C in the fluid and heated starch and thoroughly mixing it therewith prior to starching the clothes the starched parts of the clothes will have a newness of appearance, be smooth and glossy after being subjected to the ironing process, and the smooth and glossy surface will be of such character that dust and smutty matter will not penetrate it nor adhere to it; therefore said surface will remain clean for a long time, and when soiled will be easily washed.

The cake shown in Fig. 1 is intended as an accompaniment with the starch in each package of starch as shown in Fig. 2. By this combination of the said cake of compound hereinbefore described with the starch in each package increased value will be given to said package of starch, and at the same time be a very convenient combination that will result in saving time and labor in laundry-work.

The compound for starch herein described may be made in other form or forms than that shown in Fig. 1, and placed in the package of starch; therefore I do not confine myself to any one form, shape, or contour of said compound for the purpose of being placed in the package with the starch.

The essentials of my invention consist in the compound and its combination with the starch in boxes or packages, as herein stated, and for the purpose specified.

Having thus described my improvement, what I claim is—

1. A compound for mixing with starch, consisting of the ingredients herein named made into a homogeneous mass and molded into form, as and for the purpose described.

2. The compound hereinbefore described, molded into form or forms and placed in a box or package of starch, as and for the purpose herein set forth.

In testimony whereof I have hereunto set my hand this 11th day of September, A. D. 1884.

W. H. MIDGLEY.

Witnesses:
A. C. JOHNSTON,
C. S. JOHNSTON.